United States Patent
Takane

(10) Patent No.: US 10,735,676 B2
(45) Date of Patent: Aug. 4, 2020

(54) SOLID-STATE IMAGING DEVICE, METHOD FOR DRIVING SOLID-STATE IMAGING DEVICE AND ELECTRONIC APPARATUS FOR EXTENDING A DYNAMIC RANGE

(71) Applicant: Brillnics Japan Inc., Tokyo (JP)

(72) Inventor: Yasuo Takane, Tokyo (JP)

(73) Assignee: Brillnics Japan Inc., Tokyo (JP)

( * ) Notice: Subject to any disclaimer, the term of this patent is extended or adjusted under 35 U.S.C. 154(b) by 60 days.

(21) Appl. No.: 16/065,351

(22) PCT Filed: Dec. 26, 2016

(86) PCT No.: PCT/JP2016/088654
§ 371 (c)(1),
(2) Date: Jun. 22, 2018

(87) PCT Pub. No.: WO2017/111154
PCT Pub. Date: Jun. 29, 2017

(65) Prior Publication Data
US 2019/0020832 A1 Jan. 17, 2019

(51) Int. Cl.
*H04N 5/347* (2011.01)
*H04N 5/355* (2011.01)
(Continued)

(52) U.S. Cl.
CPC .......... *H04N 5/347* (2013.01); *H04N 5/2355* (2013.01); *H04N 5/23245* (2013.01); *H04N 5/243* (2013.01); *H04N 5/355* (2013.01)

(58) Field of Classification Search
CPC ...... H04N 5/347; H04N 5/243; H04N 5/2355; H04N 5/23245; H04N 5/355
(Continued)

(56) References Cited

U.S. PATENT DOCUMENTS

2008/0252750 A1* 10/2008 Ogawa .................. H04N 5/243
348/229.1
2012/0327270 A1* 12/2012 Shirakawa ........... H04N 5/2356
348/239

FOREIGN PATENT DOCUMENTS

JP 3592106 B2 11/2004
JP 3984814 B2 10/2007
(Continued)

OTHER PUBLICATIONS

International Search Report dated Mar. 14, 2017, issued in counterpart International Application No. PCT/JP2016/088654 (1 page).

*Primary Examiner* — Lin Ye
*Assistant Examiner* — Chan T Nguyen
(74) *Attorney, Agent, or Firm* — Westerman, Hattori, Daniels & Adrian, LLP

(57) ABSTRACT

A solid-state imaging device 10 capable of extending a dynamic range by combining a plurality of read-out signals has a signal processing part 710 which, when combining the plurality of read-out signals, selects at least one signal which becomes necessary for the combination in accordance with a result of a comparison between at least one read-out signal among the plurality of read-out signals (high conversion gain signal HCG, low conversion gain signal LCG) with a threshold value (Joint Thresh), applies the selected signal to the combinational processing, and thereby generates the combined signal extended in the dynamic range, and the signal processing part can dynamically change the threshold value. By this configuration, it is possible to smoothly switch a plurality of signals to be combined irrespective of variations in individual units etc., possible to realize a higher dynamic range while suppressing deterioration of images, and consequently possible to realize a higher quality of image.

15 Claims, 12 Drawing Sheets

(51) Int. Cl.
*H04N 5/232* (2006.01)
*H04N 5/235* (2006.01)
*H04N 5/243* (2006.01)

(58) Field of Classification Search
USPC .......................................................... 348/308
See application file for complete search history.

(56) References Cited

FOREIGN PATENT DOCUMENTS

| | | |
|---|---|---|
| JP | 2008-263522 A | 10/2008 |
| JP | 2009-88928 A | 4/2009 |
| JP | 2013-9105 A | 1/2013 |

\* cited by examiner

SOLID-STATE IMAGING DEVICE, METHOD FOR DRIVING SOLID-STATE IMAGING DEVICE AND ELECTRONIC APPARATUS FOR EXTENDING A DYNAMIC RANGE

TECHNICAL FIELD

The present invention relates to a solid-state imaging device, a method for driving a solid-state imaging device, and an electronic apparatus.

BACKGROUND ART

As solid-state imaging devices (image sensors) using photoelectric conversion elements detecting light and generating a charge, CMOS (complementary metal oxide semiconductor) image sensors have been put into practical use. CMOS image sensors have been widely applied as parts of digital cameras, video cameras, monitoring cameras, medical endoscopes, personal computers (PC), mobile phones and other portable terminals (mobile devices) and other various types of electronic apparatuses.

A CMOS image sensor, for each pixel, has an FD amplifier having a photodiode (photoelectric conversion element) and a floating diffusion layer (FD) layer. The mainstream of reading operations for the same is a column parallel output type selecting a certain row in a pixel array and simultaneously reading the pixels in a column direction.

In this regard, for improvement of characteristics, various methods for realizing solid-state imaging devices (CMOS image sensors) of a high quality of image having a high dynamic range (HDR) have been proposed.

Conventionally, in a solid-state imaging device, as a method for raising (extending) the dynamic range, for example, there are known a method of reading two types of signals having different storage times from the same pixel in the image sensor and combining these two types of signals to extend the dynamic range, a method of combining a signal of a pixel having a high sensitivity which has a small dynamic range and a signal of a low sensitivity which is extended in the dynamic range to thereby extend the dynamic range, and other methods.

For example, PTL 1 discloses a technique for raising the dynamic range by dividing exposure into two or more steps of an image capture corresponding to a high luminance side by a short exposure time and an image capture corresponding to a low luminance side by a long exposure time. Further, PTL 1 discloses a technique for raising the dynamic range by making the capacity of the floating diffusion variable.

Further, PTL 2 discloses a technique for raising the dynamic range by connecting a floating diffusion of a small capacity C1 on a high sensitivity and low luminance side and a floating diffusion of a large capacity C2 on a low sensitivity and high luminance side to a photodiode PD and individually outputting an output OUT1 on the low luminance side and an output OUT2 on the high luminance side.

As the method of combining these signals, in terms of time, there is a system covering a plurality of frames, a system outputting two or more types of signals having different dynamic ranges in one frame, and the like.

CITATION LIST

Patent Literature

PTL 1: Japanese Patent No. 3984814
PTL 2: Japanese Patent No. 3592106

SUMMARY OF INVENTION

Technical Problem

In this regard, in each of these methods, it is necessary to keep the plurality of signals to be assembled together (combined) almost equal in linearity of output voltages with respect to quantities of incident light (luminance) in the vicinity of the signal values which are combined (switching of signals). In order to extend the dynamic ranges (D ranges), the signals are designed so that their gains with respect to the quantities of light (luminances) are different, therefore mainly the gains are corrected in a digital signal processor after digital conversion in an analog-to-digital converter (ADC), so that their linearities (or inclinations) are kept the same.

However, there are variations among individual units of solid-state imaging devices and variations among pixels in single units. Therefore, even if the signals are switched by a numerical value corrected based on the parameter of the center value of the variation, sometimes the linearity in the vicinity of that level is not always guaranteed. When the precision of correction is low (varies) in this way, smooth switching becomes impossible, therefore discontinuous points are formed becoming noise, resulting in the disadvantage of causing so-called "tone jump" or other deterioration of the image.

The present invention provides a solid-state imaging device capable of smoothly switching a plurality of signals to be combined irrespective of individual variations and the like, capable of realizing a higher dynamic range while suppressing deterioration of the image, and consequently capable of realizing a higher image quality, a method for driving a solid-state imaging device, and an electronic apparatus.

Solution to Problem

A first aspect of the present invention is a solid-state imaging device capable of extending a dynamic range by combining a plurality of read-out signals, having a signal processing part which, when combining the plurality of read-out signals, selects at least one signal which becomes necessary for a combinational operation in accordance with a result of a comparison between at least one read-out signal among the plurality of read-out signals and a threshold value, applies the selected signal to combinational processing, and generates a combined signal extended in dynamic range, wherein the signal processing part can dynamically change the threshold value.

A second aspect of the present invention is a method for driving a solid-state imaging device capable of extending a dynamic range by combining a plurality of read-out signals, comprising a comparison process of, when combining the plurality of read-out signals, comparing at least one read-out signal among the plurality of read-out signals and a threshold value, a selection process of selecting at least one signal which becomes necessary for a combinational operation in accordance with the result of comparison, and a generation process of applying the selected signal to combinational processing and generating a combined signal extended in dynamic range, wherein the processing in the comparison process, the selection process, and the generation process is carried out by dynamically changing the threshold value.

An electronic apparatus of a third aspect of the present invention has a solid-state imaging device capable of extending a dynamic range by combining a plurality of read-out signals and an optical system for forming a subject image in the solid-state imaging device, wherein the solid-state imaging device includes a signal processing part which, when combining the plurality of read-out signals, selects at least one signal which becomes necessary for a combinational operation in accordance with a result of a comparison between at least one read-out signal among the plurality of read-out signals and a threshold value, applies the selected signal to combinational processing, and generates a combined signal extended in dynamic range, and the signal processing part can dynamically change the threshold value.

Advantageous Effect of Invention

According to the present invention, it is possible to smoothly switch a plurality of signals to be combined irrespective of variations in individual units etc., possible to realize a higher dynamic range while suppressing deterioration of images, and consequently possible to realize a higher quality of image.

REFERENCE SIGNS LIST

10 . . . solid-state imaging device, 20 . . . register controller, 30 . . . timing controller, 40 . . . pixel array part, 50 . . . analog gain part, 60 . . . analog-to-digital converter (ADC), 70 . . . digital signal processor (DSP), 710, 710A . . . signal processing parts, 711, 712 . . . multipliers, 713, 713A . . . combinational processing parts, 714 . . . random number generating part, 80 . . . scalable low voltage signal transmission (SLVS) interface part, 90 . . . clock generator, 100 . . . electronic apparatus, 110 . . . CMOS image sensor, 120 . . . optical system, and 130 . . . signal processing circuit (PRC).

DESCRIPTION OF EMBODIMENTS

Below, embodiments of the present invention will be explained with reference to the drawings.

First Embodiment

Figure 1:
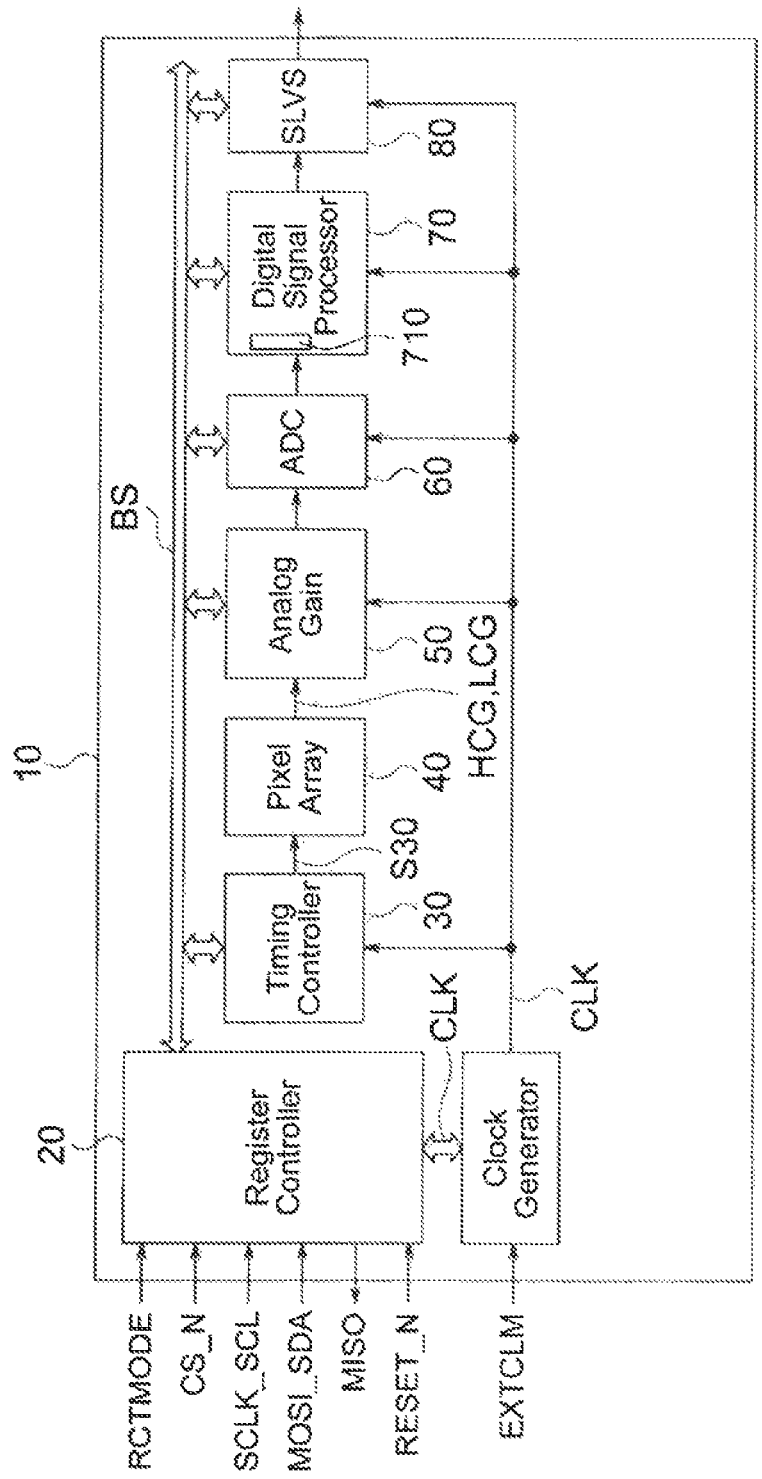
FIG. 1 is a block diagram showing an example of an overall configuration of a signal processing system in a solid-state imaging device according to a first embodiment of the present invention.

FIG. 1 is a block diagram showing an example of an overall configuration of a signal processing system in a solid-state imaging device according to a first embodiment of the present invention. In the present embodiment, a solid-state imaging device 10 is configured so that it can extend a dynamic range by combining a plurality of (two or three or more) read-out signals read out from pixels and is configured by for example a CMOS image sensor.

The solid-state imaging device 10 in FIG. 1, as principal components, has a register controller 20, timing controller 30, pixel array part 40, analog gain part 50, analog-to-digital converter (ADC) part 60, digital signal processor (DSP) 70 including a function as a signal processing part, scalable low voltage signal transmission (SLVS) interface part 80, and clock generator 90.

In the solid-state imaging device 10, the register controller 20, timing controller 30, analog gain part 50, ADC part 60, DSP part 70, and SLVS interface part 80 are connected by a bus BS for transmitting and receiving the signals. Further, the system clock CLK generated by the clock generator 90 is supplied to the register controller 20, timing controller 30, analog gain part 50, ADC part 60, DSP part 70, and SLVS interface part 80.

The register controller 20 communicates with a not shown CPU, DSP, or other external control device and functions as a memory part in which operation modes are set and various types of control parameters are written.

The timing controller 30 generates a control pulse S30 for reading out the pixel data matching with various operation modes and performs readout control of the pixel array part 40.

In the pixel array part 40, a plurality of pixels each including a photodiode (photoelectric conversion element) and inter-pixel amplifier are arranged in a two-dimensional matrix comprised of N rows and M columns.

According to the control pulse S30 from the timing controller 30, the read-out signals read out from a group of pixels including photoelectric conversion elements in the pixel array part 40 are amplified with predetermined gains in the analog gain part 50, converted to digital signals in the ADC part 60, and input to the DSP part 70 functioning as the signal processing part as will be explained in detail later. Note that, for example, a column memory is arranged in an output stage of the ADC part 60.

In the DSP part 70, correlated double sampling (CDS), black correction, digital gain, and other image signal processing are applied to the input digital signals, then the results are output while adapted to the output type (SLVS in FIG. 1) in the SLVS interface part 80.

In the present embodiment, as the read-out signals read out from the group of pixels including photoelectric conversion elements in the pixel array part 40, as shown in FIG. 1, two or more types (two types in the present example) of signals having different photoelectric conversion gains such as signals of the two systems of a high conversion gain signal (HCG: high conversion gain) and a low conversion gain signal (LCG: low conversion gain) are read out. Further, the two signals are combined in the signal processing part 710 in the DSP part 70 to thereby generate a high dynamic range signal extended in dynamic range.

Note that, there are two systems of the read-out signals. However, as will be explained later, it is possible to process then in a time division manner by setting a portion concerning reading of a signal (for example signal line) as one system.

The high conversion gain signal HCG is a high gain output signal from the photoelectric conversion element part. However, it becomes saturated by a smaller quantity of incident light in comparison with the low conversion gain signal LCG by that amount. The low conversion gain signal LCG is a low gain output signal, therefore has enough of a margin before the quantity of incident light which reaches saturation, so is larger in comparison with the high conversion gain signal HCG. Therefore, in the signal processing part 710 in the DSP part 70, by making the inclinations of the low conversion gain signal LCG and the high conversion gain signal HCG equal and, at the same time, by combining these two types of signals before the saturation of the high conversion gain signal HCG, that is, in an area where the linearity is maintained (nonsaturation area), a combined signal of a signal raised in dynamic range is acquired.

The signal processing part 710 in the DSP part 70 performing the combinational processing of these high conversion gain signal HCG and low conversion gain signal LCG basically has characteristic configuration and function which will be shown below. The concrete combinational processing will be explained in detail later.

The signal processing part 710 in the present embodiment is configured so that it can extend the dynamic range by combining a plurality of read-out signals (in this example, the high conversion gain signal HCG and low conversion gain signal LCG). The signal processing part 710 makes the inclinations of the plurality of read-out signals to be combined, for example, the high conversion gain signal HCG and low conversion gain signal LCG, equal. When combining the plurality of read-out signals, the signal processing part 710 selects at least one signal which becomes necessary for the combinational operation in accordance with a result of a comparison between at least one read-out signal among the plurality of read-out signals (high conversion gain signal HCG and low conversion gain signal LCG) and a threshold value (Joint Thresh), applies the selected signal to the combinational processing, and generates a combined signal extended in dynamic range.

Further, the signal processing part 710 in the present embodiment is configured so that it can dynamically change the threshold value. The signal processing part 710, as the threshold value, applies a reference threshold value (center threshold value) Joint Thresh (hereinafter, J_Thresh) which is set in advance and a new threshold value determined by performing a comparison operation (for example addition or subtraction) of the reference threshold value J_Thresh and a predetermined step value step α (α is a natural number) to the combinational processing.

Note that, the reference threshold value (center threshold value) J_Thresh which is set in advance is for example written into a register (REG) as the memory part in a rewritable manner.

The signal processing part 710 has a weighting processing part which, for example, performs weighting processing on the plurality of read-out signals covered by the combinational operation (high conversion gain signal HCG and low conversion gain signal LCG) in accordance with the result of comparison between the read-out signal used as the reference among the plurality of read-out signals (for example the high conversion gain signal HCG) and the corresponding threshold value (J_Thresh, J_Thresh±step α). The weighting processing part, at the signal level of an area sandwiched by threshold values, calculates an average weighting value according to the weighting value assigned to this area and outputs the average weighting value as the combined signal of that area.

Further, the weighting processing part in the signal processing part 710 is configured including an average processing function for averaging the plurality of read-out signals. The average processing function converts the signals at the signal level of the area sandwiched by the threshold values to a single output with the use of the averaged value.

Below, an example of the configuration of a pixel PXL capable of generating a low conversion gain signal LCG and high conversion gain signal HCG, will be explained, then an example of the configuration in the signal processing part 710 in the DSP part 70 and concrete combinational processing of the low conversion gain signal LCG and high conversion gain signal HCG will be explained.

Example of Configuration of Pixel PXL in Pixel Array Part 40

Figure 2:
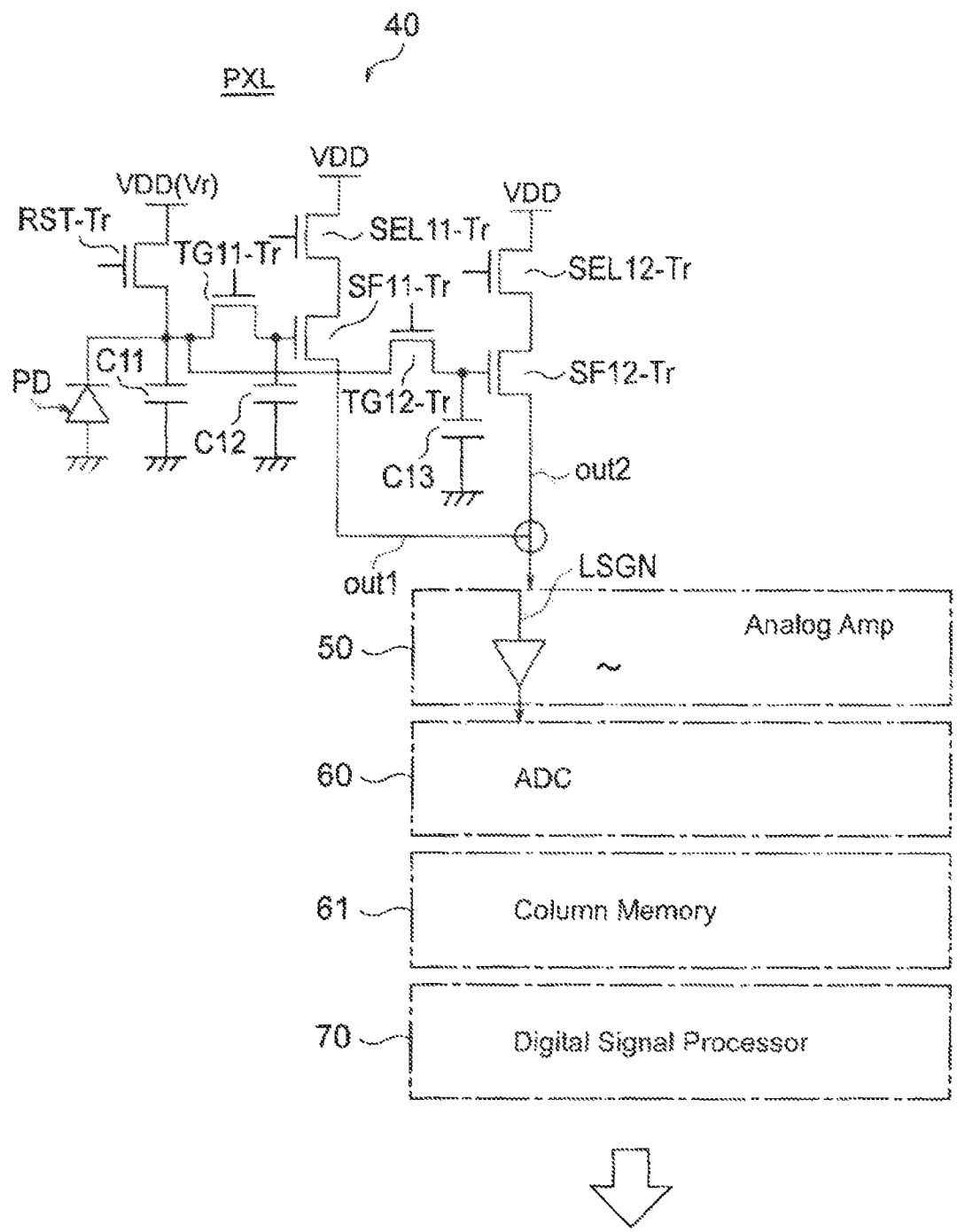
FIG. 2 is a view showing an example of the configuration of a pixel capable of generating a low conversion gain signal and a high conversion gain signal in a pixel array part according to the first embodiment.

FIG. 2 is a view showing an example of the configuration of a pixel PXL capable of generating a low conversion gain signal LCG and high conversion gain signal HCG in the pixel array part 40 according to the first embodiment.

The pixel PXL in FIG. 2 has a photodiode PD, a capacity C11 which is connected to the cathode side of the photodiode PD and is formed by a parasitic capacitance or additional capacitance, and a reset transistor RST-Tr resetting the photodiode PD and capacities C11 to C13.

The photodiode PD generates a signal charge (here, electrons) in an amount in accordance with the quantity of incident light and accumulates the same. Below, the explanation will be given for a case where the signal charge is electrons and each transistor is an n-type transistor. However, the signal charges may be holes and each transistor may be a p-type transistor as well.

The pixel PXL has a transfer transistor TG11-Tr as the transfer switch connected to the capacity C11, a capacity C12 for accumulating charges transferred from the photodiode PD and capacity C11, a selection transistor SEL11-Tr as a selection switch, and a source follower transistor SF11-Tr connected in the gate to the capacity C12.

Further, the pixel PXL has a transfer transistor TG12-Tr as the transfer switch connected to the capacity C11, a capacity C13 accumulating charges transferred from the photodiode PD and capacity C11, a selection transistor SEL12-Tr as the selection switch, and a source follower transistor SF12-Tr connected in the gate to the capacity C13.

Note that, at the gates of the reset transistor RST-Tr, transfer transistors TG11-Tr and TG12-Tr, and selection transistors SEL11-Tr and SEL12-Tr in the pixel PXL, control pulses S30 generated in the timing controller 30 are supplied for on/off control.

In this way, the pixel PXL in FIG. 2 is comprised so that the charges accumulated in the photodiode PD and capacity C11 are output through two output systems out1 and out2. In the example in FIG. 2, the low conversion gain signal LCG is output to the output system out1, and the high conversion gain signal HCG is output to the output system out2. Further, in the configuration of FIG. 2, for example, the output system out1 and output system out2 are subjected to wired-OR, and the high conversion gain signal HCG and the low conversion gain signal LCG of two systems in columns are output in a time division manner to a car on signal line (vertical signal line) LSGN.

Next, the operation in the pixel PXL in FIG. 2 will be explained.

The potentials of the photodiode PD and the capacity C11 formed by a parasitic capacitance or additional capacitance are reset to a reset potential Vr (VDD in the example in FIG. 2) by the reset transistor RST-Tr. When light is incident upon the photodiode PD in an accumulation period, the generated photocharges are accumulated in the photodiode PD and capacity C11. By turning on the transfer transistor TG11-Tr as the transfer switch or the transfer transistor TG12-Tr as the transfer switch in this state, the potential of the capacity C12 or capacity C13 changes in accordance with the generated photocharges.

Here, in the capacity C12 and capacity C13, the parasitic capacitances of the gate electrodes of the source follower transistors SF11-Tr and SF12-Tr are individually dominant. The selection transistors SEL11-Tr and SEL12-Tr are row selection switches. They are switches for selecting certain rows of pixels PXL arranged in the state of a two-dimensional array. The selection transistors SEL11-Tr and SEL12-Tr are connected to the power supply VDD. The output system out1 and output system out2 are connected through the signal line LSGN to a constant current source not shown in the diagram and forms a source follower amplifier together with the source follower transistors SF11-Tr and SF12-Tr. Also, the selection transistors SEL11-Tr and SEL12-Tr form a source follower amplifier together with the constant current source in the same way as the source follower transistors SF11-Tr and SF12-Tr. Either source follower amplifier can be selected by selecting the transistors TG11-Tr and transistor SEL11-Tr or selecting the transistor TG12-Tr and transistor SEL12-Tr.

Due to this, the two systems of the high conversion gain signal HCG and low conversion gain signal LCG are output to the canon signal line (vertical signal line) LSGN in a time division manner. The advantage that the read capacity C12 or C13 can be selected according to the case resides in that the dynamic range (DR: D-range) can be selected according to the image capture conditions.

Concrete Combinational Processing of Low Conversion Gain Signal LCG and High Conversion Gain Signal HCG in DSP Part 70

Next, an example of the configuration of the signal processing part 710 in the DSP part 70 and the concrete combinational processing of the low conversion gain signal LCG and the high conversion gain signal HCG will be explained.

In the following explanation, a plurality of read-out signals read out from the pixels PXL including the photoelectric conversion elements include at least one set of a low conversion gain signal LCG and a high conversion gain signal HCG which is saturated by a smaller quantity of incident light in comparison with the low conversion gain signal LCG.

Figure 3:
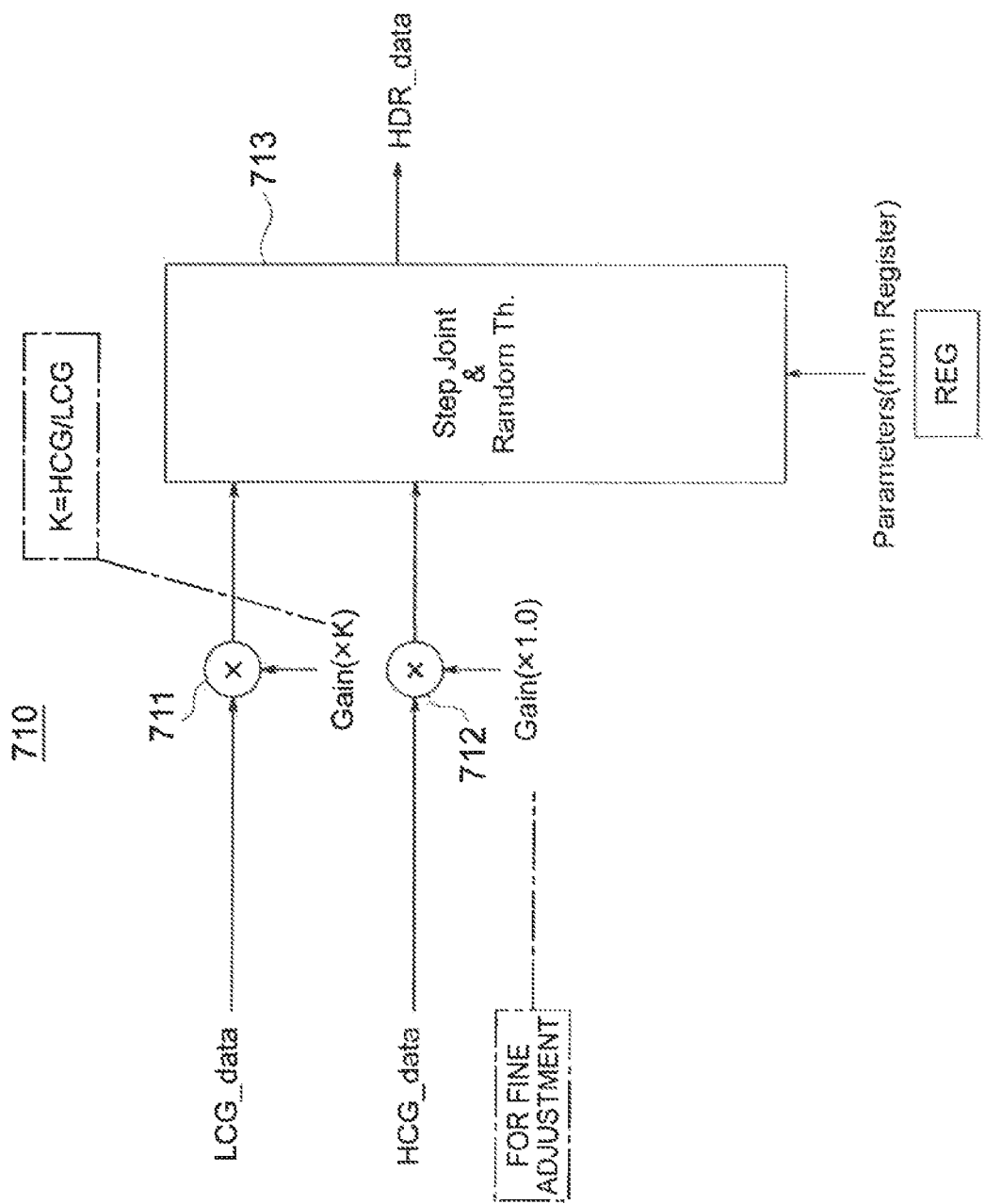
FIG. 3 is a view showing an example of the configuration of a signal processing part according to the first embodiment of the present invention.

FIG. 3 is a view showing an example of the configuration of the signal processing part according to the first embodiment in the present invention.

The signal processing part 710 in FIG. 3 has multipliers 711 and 712 and a combinational processing part 713 having a function as the weighting processing part.

The multiplier 711 multiplies the low conversion gain signal LCG which is input by a gain ratio K (=HCG/LCG) in order to make the inclination of the low conversion gain signal LCG having linearity before saturation equal to the inclination of the high conversion gain signal HCG having linearity before saturation in the same way as the former and supplies the result to the combinational processing part 713.

The multiplier 712 multiplies the high conversion gain signal HCG which is input by the gain ratio 1.0 and supplies the result to the combinational processing part 713 in order to perform fine adjustment of the inclination of the high conversion gain signal HCG. Note that, the multiplier 712 is provided for fine adjustment and is not always necessary, therefore need not always be provided.

The combinational processing part 713 receives the low conversion gain signal LCG and high conversion gain signal HCG adjusted so that their inclinations become the same and combines the low conversion gain signal LCG and high conversion gain signal HCG by combinational processing in a non-saturated area ANSAT before the saturation of the high conversion gain signal HCG and in which linearity is maintained. The combinational processing part 713 functions as the weighting processing part. It has a function as a weighting processing part which performs weighting processing on the high conversion gain signal HCG and low conversion gain signal LCG to be combined in accordance with the result of a comparison between for example the high conversion gain signal HCG used as the reference among the plurality of low conversion gain signals LCG and high conversion gain signals HCG and the corresponding threshold value (J_Thresh, J_Thresh±step α). The combinational processing part 713, as the weighting processing part, has a function of calculating the average weighting value according to the weighting value assigned to the area sandwiched between the threshold values at the signal level of this area and outputting the average weighting value as the combined signal of that area.

Further, the combinational processing part 713, as the weighting processing part, is configured including an average processing function for averaging the low conversion gain signals LCG and the high conversion gain signals HCG. The average processing function is for converting the averaged value of the signals at the signal level of the area sandwiched between the threshold values to a single output.

A plurality of signal processing parts 710 having the above configuration are arranged corresponding to the columns in the matrix arrangement in the pixel array part 40.

The basic block configuration of the signal processing part 710 according to the present embodiment was explained above. Next, a combinational method for combining two signals, i.e., a high conversion gain signal HCG and a low conversion gain signal LCG, having different characteristics by the signal processing part 710 according to the present embodiment and forming a high dynamic range signal will be more specifically explained by illustration.

FIGS. 4(A) to 4(C) are views for specifically explaining the compositional method of combining the high conversion gain signal HCG and the low conversion gain signal LCG to form a high dynamic range signal. FIG. 4(A) shows an outline of processing for adjustment so that the inclinations of the high conversion gain signal HCG and the low conversion gain signal LCG become the same. FIG. 4(B) shows that, in the non-saturated area ANSAT of the high conversion gain signal HCG before saturation and in which linearity is maintained, the high conversion gain signal HCG and the low conversion gain signal LCG are smoothly combined stepwise in four steps by the combinational processing. FIG. 4(C) schematically illustrates the relationships among the center threshold value J_Thresh, join positions (points) jp0 to jp3, dynamically set threshold values (J_Thresh−step2), (J_Thresh−step1), (J_Thresh+step1), and (J_Thresh+step2), and the weighting value in a case where the high conversion gain signal HCG and the low conversion gain signal LCG are smoothly combined stepwise in four steps. FIG. 5 schematically shows the relationships among the signal level, center threshold value J_Thresh, join positions (points) jp0 to jp3, dynamically set threshold values (J_Thresh−step2), (J_Thresh−step1), (J_Thresh+step1), and (J_Thresh+step2), and the area between the threshold values in the case where the high conversion gain signal HCG and the low conversion gain signal LCG are smoothly combined stepwisely in four steps.

Figure 4:
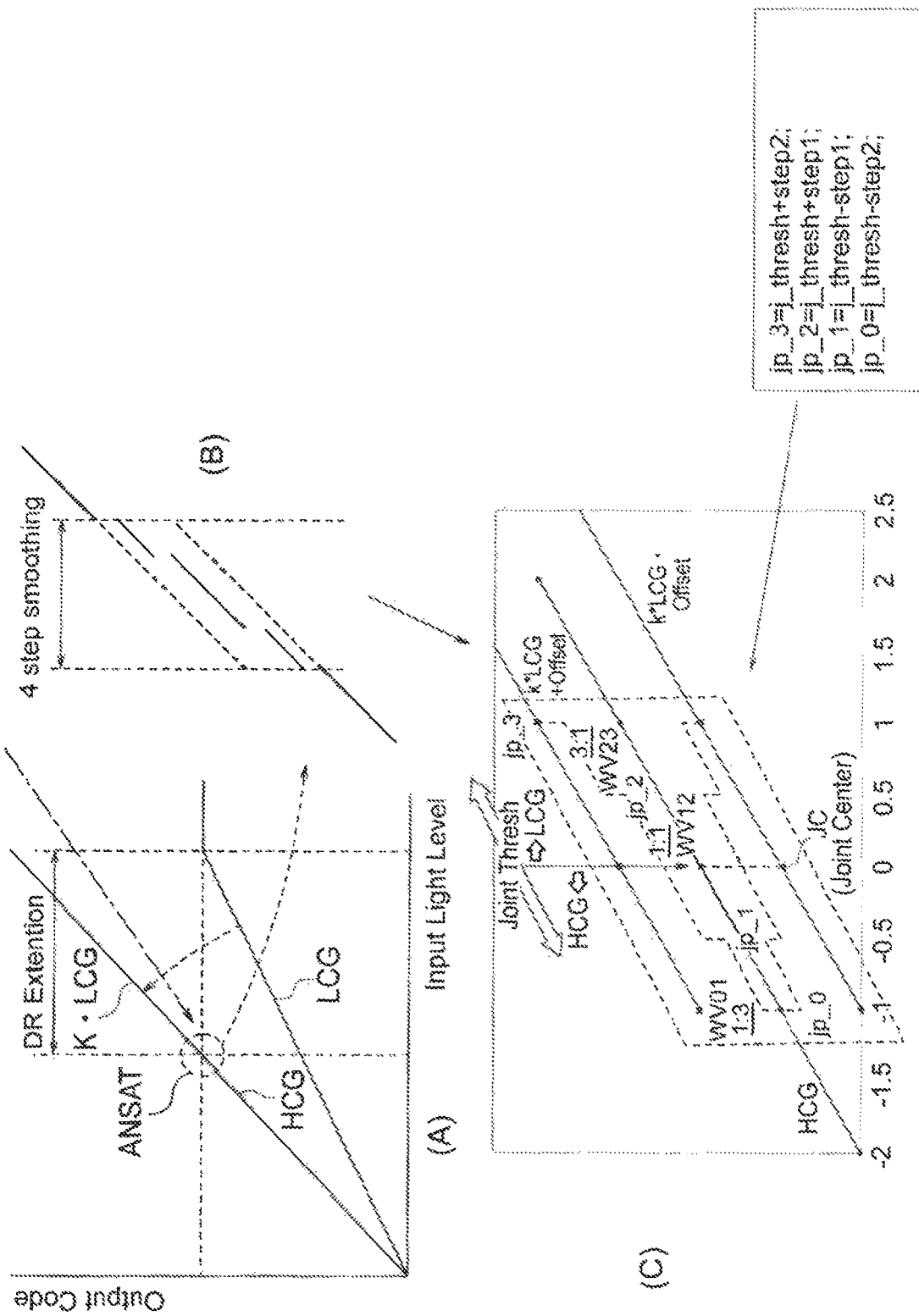
FIG. 4 is a view for specifically explaining a combining method of combining a high conversion gain signal and a low conversion gain signal to obtain a high dynamic range signal.
Figure 5:
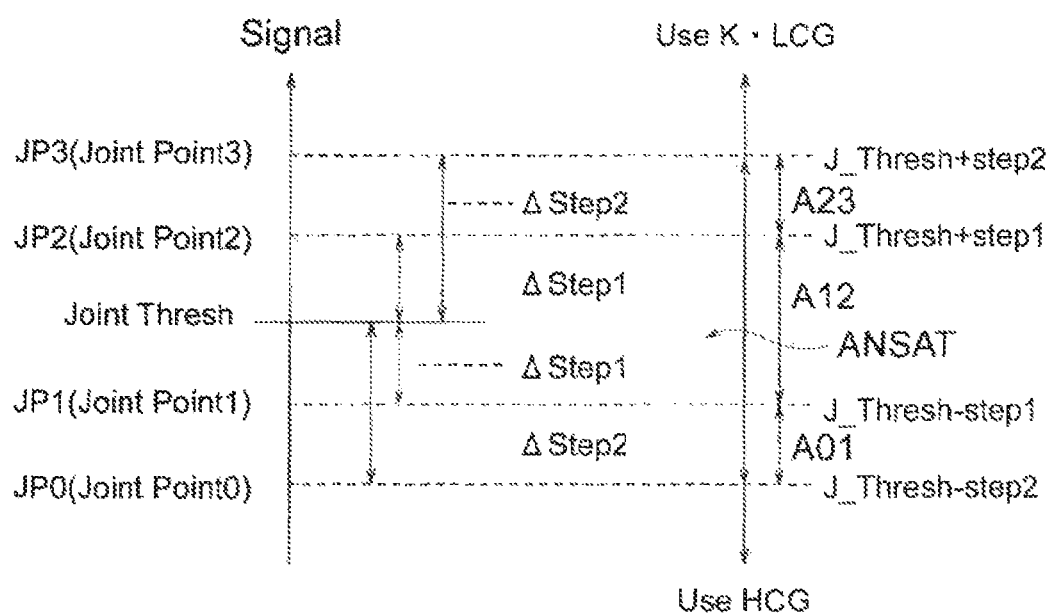
FIG. 5 is a view schematically showing the relationships among a signal level, center threshold value, each join position (point), and a dynamically set threshold value where the low conversion gain signal and the high conversion gain signal are smoothly combined stepwise in four steps.

In FIG. 4, the high conversion gain signal HCG and low conversion gain signal LCG correspond to the two systems of signals explained before. Here, as shown in FIG. 2, both of the high conversion gain signal HCG and the low conversion gain signal LCG are digital signals. As explained before, the high conversion gain signal HCG is a high gain output signal from the photoelectric conversion element part. However, it is saturated by a smaller quantity of incident light by that amount in comparison with the low conversion gain signal LCG. The low conversion gain signal LCG is a low gain output signal, so has enough of a margin before the quantity of incident light which reaches saturation, so is larger in comparison with the high conversion gain signal HCG. Therefore, in the signal processing part 710 in the DSP part 70, the inclinations of the low conversion gain signal LCG and the high conversion gain signal HCG are made the same. These two signals are combined before the saturation of the high conversion gain signal HCG, that is, in the non-saturated area ANSAT in which the linearity is maintained, to thereby obtain a signal raised in the dynamic range (DR).

The combinational processing part 713 in the signal processing part 710 can perform combinational processing by using for example the high conversion gain signal HCG as a reference. The combinational processing part 713, for example, as shown in FIG. 4(C) and FIG. 5, sets the reference threshold value as the center threshold value J_Thresh at the position JC of the center part (Joint Center) of the non-saturated area ANSAT.

Between the joint center JC at which the center threshold value J_Thresh is set and a high gain signal endmost part side join position jp (joint point) 0 at which the combined signal should be joined with the high conversion gain signal HCG, the combinational processing part 713, for example, as shown in FIG. 4(C) and FIG. 5, sets the two high gain side join positions jp0 and jp1 including the high gain signal endmost part side join position jp0 and sets high gain side step values (−)step1 and (−)step2 (step2>step1) corresponding to the set high gain side join positions jp1 and jp0 which gradually became larger from the joint center JC toward the high gain signal endmost part.

Between the joint center JC at which the center threshold value J_Thresh is set and a low gain signal endmost part side join position jp3 at which the combined signal should be joined with the low conversion gain signal LCG, the combinational processing part 713, for example, as shown in FIG. 4(C) and FIG. 5, sets the two low gain side join positions jp3 and jp2 including the low gain signal endmost part side join position jp3 and sets low gain side step values step1 and step2 (step2>step1) corresponding to the set low gain side join positions jp2 and jp3 which gradually became larger from the joint center JC toward the low gain signal endmost part.

Further, the combinational processing part 713, for example as shown in FIG. 4(C) and FIG. 5, subtracts the set high gain side step values step2 and step1 from the center threshold value J_Thresh and sets the results as new threshold values (J_Thresh−step2) and (J_Thresh−step1) of the corresponding high gain side join positions jp0 and jp1. The combinational processing part 713 applies the new threshold values and performs combinational processing in accordance with the results of comparison between the threshold values (J_Thresh−step2) and (J_Thresh−step1) at the high gain side join positions jp0 and jp1 and the high conversion gain signal HCG.

In the same way, the combinational processing part 713, for example as shown in FIG. 4(C) and FIG. 5, adds the low gain side step values step1 and step2 set at the center threshold value J_Thresh and sets the results as the new threshold values (J_Thresh+step1) and (J_Thresh+step2) of the corresponding low gain side join positions jp2 and jp3. The combinational processing part 713 applies the new threshold values and performs the combinational processing in accordance with the results of comparison between the threshold values (J_Thresh+step1) and (J_Thresh+step2) at the low gain side join positions jp2 and jp3 and the high conversion gain signal HCG.

At the signal levels of the areas A01, A12, and A23 which are sandwiched by the values selected according to the comparison between the threshold values (J_Thresh−step2) or (J_Thresh−step1) of the high gain side join position jp0 or jp1 or the threshold values (J_Thresh+step1) or (J_Thresh+step2) of the low gain side join position jp2 or jp3 with the high conversion gain signal HCG, the combinational processing part 713, in the comparison processing according to the combinational processing, calculates average weighting values AVW01, AVW12, and AVW23 according to the weighting values WV01, WV12, and WV23 assigned to the areas A01, A12, and A23 and outputs the average weighting values AVW01, AVW12, and AVW23 as the combined signals (combined data) data_dhdr of those areas.

For example, in the area A01 sandwiched between the threshold value (J_Thresh−step2) of the high gain side join position jp0 and the threshold value (J_Thresh−step1) of the adjacent high gain side join position jp1, a weighting value WV01 of "1" is assigned to the low conversion gain signal LCG and a weighting value WV01 of "3" is assigned to the high conversion gain signal HCG (LCG:HCG=1:3).

In the area A12 sandwiched between the threshold value (J_Thresh−step1) at the high gain side join position jp1 and the threshold value (J_Thresh+step1) at the adjacent low gain side join position jp2, a weighting value WV12 of "1" is assigned to the low conversion gain signal LCG and a weighting value WV12 of "1" is assigned to the high conversion gain signal HCG (LCG:HCG=1:1).

In the area A23 sandwiched between the threshold value (J_Thresh+step1) of the low gain side join position jp2 and the threshold value (J_Thresh+step2) of the adjacent low gain side join position jp3, a weighting value WV23 of "3" is assigned to the low conversion gain signal LCG and a weighting value WV23 of "1" is assigned to the high conversion gain signal HCG (LCG:HCG=3:1).

When the level of the high conversion gain signal HCG is smaller than the threshold value (J_Thresh−step2) as a result of a comparison between the threshold value (J_Thresh−step2) of the high gain signal endmost part side join position jp0 and the high conversion gain signal HCG (data_hcg), the combinational processing part 713 applies the high conversion gain signal HCG (data_hcg) as the combined signal (combined data) data_dhdr.

When the level of the high conversion gain signal HCG is larger than the threshold value (J_Thresh+step2) as a result of a comparison between the threshold value (J_Thresh+step2) of the low gain signal endmost part side join position jp3 and the high conversion gain signal HCG (data_hcg), the combinational processing part 713 applies the low conversion gain signal LCG (data_lcg) as the combined signal (combined data) data_dhdr.

Figure 6:
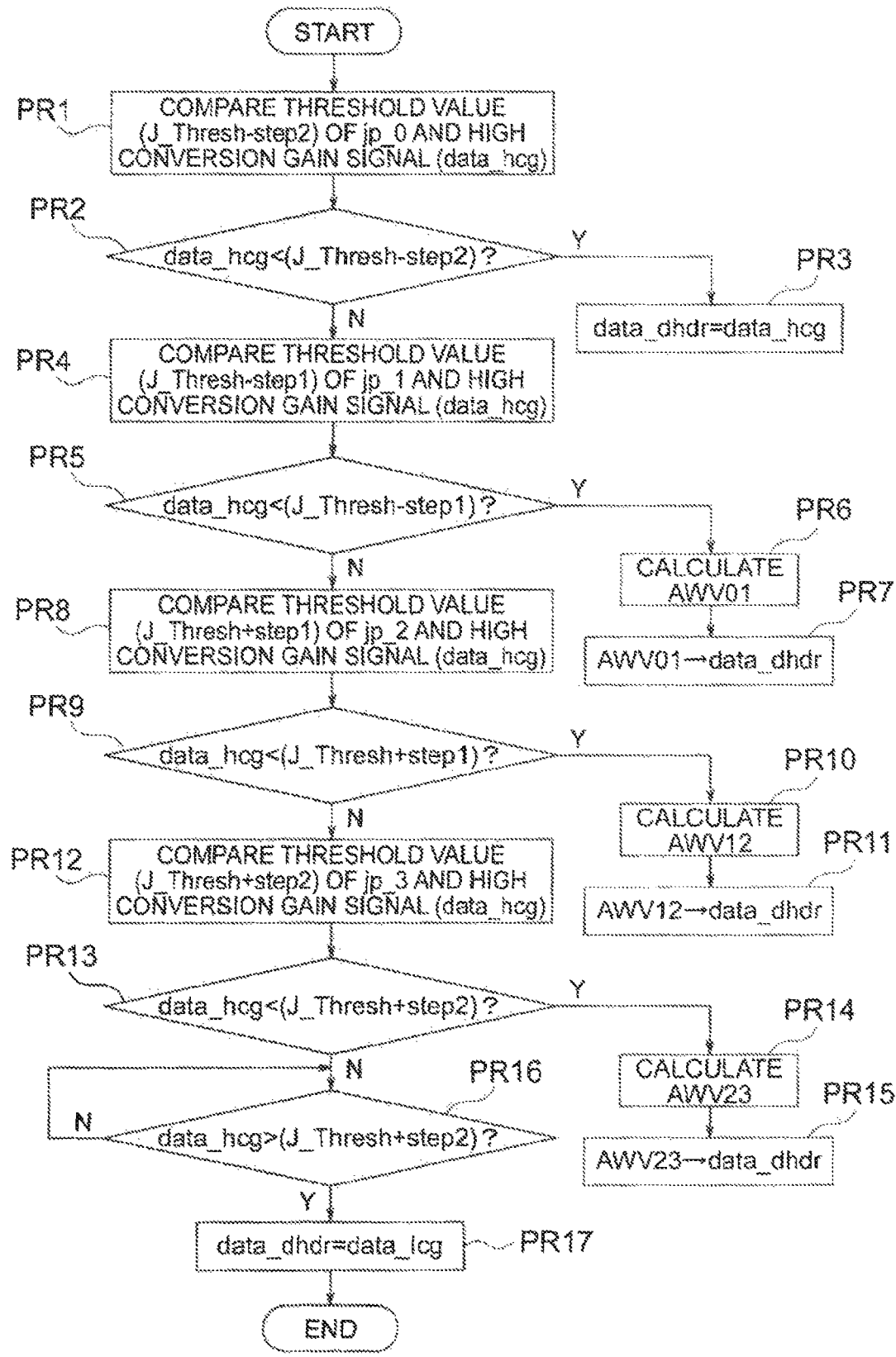
FIG. 6 is a flow chart for explaining an example of combinational processing in a signal processing part according to the first embodiment.

The configuration and function of the combinational processing part 713 in the signal processing part 710 were explained above. Here, an example of concrete combinational processing of the high conversion gain signal HCG and the low conversion gain signal LCG in the combinational processing part 713 will be explained. FIG. 6 is a flow chart for explaining an example of the combinational processing in the signal processing part 710 according to the present embodiment.

Now, when considering a case of combination using the high conversion gain signal HCG as the reference, it can be expressed as in the following description:

$$data\_hcg = data\_hcg\_in + hcg\_offset \quad \text{(Equation 1)}$$

When it is multiplied by the digital gain and is converted so that its inclination becomes the same as that of the high conversion gain signal HCG, the low conversion gain signal LCG can be expressed as follows:

$$data\_lcg = (data\_lcg\_in + lcg\_offset) \times K \quad \text{(Equation 2)}$$

where, K indicates the gain ratio of HCG/LCG.

In combining these two signals, the processing is carried out under the following set conditions:

if (data_hcg<(j_thresh−step2))

data_dhdr=data_hcg;

if (data_hcg<(j_thresh−step1))

data_dhdr=(data_hcg×3+data_lcg)/4;

if (data_hcg<(j_thresh+step1))

data_dhdr=(data_hcg+data_lcg)/2;

if (data_hcg<(j_thresh+step2))

data_dhdr=(data_hcg+data_lcg×3)/4;

if (data_hcg>(j_thresh+step2))

data_dhdr=−data_lcg;  (Equation 3)

The processing for the combination of this combinational processing part 713 will be explained with reference to FIG. 6.

The combinational processing part 713, for example, first compares the threshold value (J_Thresh−step2) of the high gain signal endmost part side join position jp0 and the high conversion gain signal HCG (data_hcg) (process PR1) and judges whether the level of the high conversion gain signal HCG is smaller than the threshold value (J_Thresh−step2) (process PR2).

When judging in the process PR2 that the level of the high conversion gain signal HCG (data_hcg) is smaller than the threshold value (J_Thresh−step2), the combinational processing part 713 applies the high conversion gain signal HCG (data_hcg) as the combined signal (combined data) data_dhdr (process PR3).

When judging in the process PR2 that the level of the high conversion gain signal HCG (data_hcg) is larger than the threshold value (J_Thresh−step2), the combinational processing part 713 compares the threshold value (J_Thresh−step1) of the high gain side join position jp1 and the high conversion gain signal HCG (data_hcg) (process PR4) and judges whether the level of the high conversion gain signal HCG (data_hcg) is smaller than the threshold value (J_Thresh−step1) (process PR5).

When judging in the process PR5 that the level of the high conversion gain signal HCG (data_hcg) is smaller than the threshold value (J_Thresh−step1), the combinational processing part 713 performs the following processing (processes PR6, PR7): The combinational processing part 713 calculates the average weighting value AVW01 of the high conversion gain signal HCG and low conversion gain signal LCG by the following equation according to the weighting values WV01 assigned to the area A01 sandwiched between the threshold value (J_Thresh−step2) of the high gain side join position jp0 and the threshold value (J_Thresh−step1) of the adjacent high gain side join position jp1 (LCG: HCG=1:3) (process PR6) and applies the average weighting value AVW01 as the combined signal (combined data) data_dhdr of that area (process PR7).

$$AVW01 = (data\_hcg \times 3 + data\_lcg)/4 \quad \text{(Equation 4)}$$

When judging in the process PR5 that the level of the high conversion gain signal HCG (data_hcg) is larger than the threshold value (J_Thresh−step1), the combinational processing part 713 compares the threshold value (J_Thresh+step1) of the low gain side join position jp2 and the high conversion gain signal HCG (data_hcg) (process PR8) and judges whether the level of the high conversion gain signal HCG (data_hcg) is smaller than the threshold value (J_Thresh+step1) (process PR9).

When judging in the process PR9 that the level of the high conversion gain signal HCG (data_hcg) is smaller than the threshold value (J_Thresh+step1), the combinational processing part 713 performs the following processing (processes PR10, PR11): The combinational processing part 713 calculates the average weighting value AVW12 of the high conversion gain signal HCG and low conversion gain signal LCG by the following equation according to the weighting value WV12 assigned to the area A12 sandwiched between the threshold value (J_Thresh−step1) of the high gain side join position jp1 and the threshold value (J_Thresh+step1) of the adjacent low gain side join position jp2 (LCG: HCG=1:1) (process PR10) and applies the average weighting value AVW12 as the combined signal (combined data) data_dhdr of that area (process PR11).

$$AVW12 = (data\_hcg + data\_lcg)/2 \quad \text{(Equation 5)}$$

When judging in the process PR9 that the level of the high conversion gain signal HCG (data_hcg) is larger than the threshold value (J_Thresh+step1), the combinational processing part 713 compares the threshold value (J_Thresh+ step2) of the low gain signal endmost part side join position jp3 and the high conversion gain signal HCG (data_hcg) (process PR12) and judges whether the level of the high conversion gain signal HCG (data_hcg) is smaller than the threshold value (J_Thresh+step2) (process PR13).

When judging in the process PR13 that the level of the high conversion gain signal HCG (data_hcg) is smaller than the threshold value (J_Thresh+step2), the combinational processing part 713 performs the following processing (processes PR14, PR15): The combinational processing part 713 calculates the average weighting value AVW23 of the high conversion gain signal HCG and low conversion gain signal LCG by the following equation according to the weighting value WV23 assigned to the area A23 sandwiched between the threshold value (J_Thresh+step1) of the low gain side join position jp2 and the threshold value (J_Thresh+step2) of the adjacent low gain side join position jp3 (LCG: HCG=3:1) (process PR14) and applies the average weighting value AVW23 as the combined signal (combined data) data_dhdr of that area (process PR15).

$$AVW23=(data\_hcg+data\_lcg\times 3)/4 \quad \text{(Equation 6)}$$

When judging in the process PR13 that the level of the high conversion gain signal HCG (data_hcg) is not smaller, but larger than the threshold value (J_Thresh+step2) (process PR16), the combinational processing part 713 applies the low conversion gain signal LCG (data_lcg) as the combined signal (combined data) data_dhdr (process PR17).

As explained above, the signal processing part 710 in the solid-state imaging device 10 of the first embodiment is configured so as to be able to combine the plurality of read-out signals, for example, the high conversion gain signal HCG and the low conversion gain signal LCG to extend the dynamic range. The signal processing part 710 makes the inclinations of the plurality of read-out signals to be combined, for example the low conversion gain signal LCG and the high conversion gain signal HCG, equal. When combining the plurality of read-out signals, the signal processing part 710 selects at least one signal which becomes necessary for the combination in accordance with a result of a comparison between at least one read-out signal among the plurality of read-out signals (high conversion gain signal HCG, low conversion gain signal LCG) with a threshold value (Joint Thresh), applies the selected signal to the combinational processing, and thereby generates the combined signal extended in the dynamic range. Further, the signal processing part 710 in the first embodiment is configured so that it can dynamically change the threshold value. It applies to the combinational processing, as the threshold values, a reference threshold value (center threshold value) J_Thresh which is set in advance and new threshold values (J_Thresh±step $\alpha$) determined by performing a comparison operation (for example addition/subtraction) of the reference threshold value J_Thresh and a predetermined step value step $\alpha$ ($\alpha$ is a natural number).

Accordingly, according to the first embodiment, even in a case where there is variation in individual units of the solid-state imaging devices or variation between pixels in one unit, smooth switching of the plurality of signals to be assembled together (to be combined) is possible and discontinuous points can be reduced, so consequently noise can be reduced, therefore it becomes possible to generate a high quality and high dynamic image signal with a little noise. Further, it becomes possible to absorb the individual variations, therefore it becomes possible to improve the yield of products.

That is, according to the first embodiment, smooth switching of the plurality of signals to be combined is possible irrespective of individual variations etc., a higher dynamic range can be realized while suppressing deterioration of the image, and consequently it becomes possible to realize a higher quality of image.

Further, the signal processing part 710 in the first embodiment, for example, has the combinational processing part 713 including a function as a weighting processing part for performing weighting processing of the plurality of read-out signals to be combined (high conversion gain signal HCG and low conversion gain signal LCG) in accordance with the results of a comparison between the read-out signal used as a reference among the plurality of read-out signals (for example high conversion gain signal HCG) and the corresponding threshold value (J_Thresh, J_Thresh±step $\alpha$). At the signal level of the area sandwiched by the threshold values, the combinational processing part 713 including the weighting processing part calculates the average weighting value according to the weighting value assigned to this area and outputs the average weighting value as the combined signal of that area. Further, the weighting processing part is configured including an average processing function of averaging the plurality of read-out signals. The average processing function is for converting the value obtained by averaging the signals at the signal level of the area sandwiched by the threshold values to a single output.

Accordingly, according to the first embodiment, smoother switching of the plurality of signals to be assembled together (to be combined) is possible and discontinuous points can be reliably reduced, so consequently noise can be reduced. Further, it becomes possible to generate a high quality and high dynamic image signal with little noise.

Second Embodiment

Figure 7:
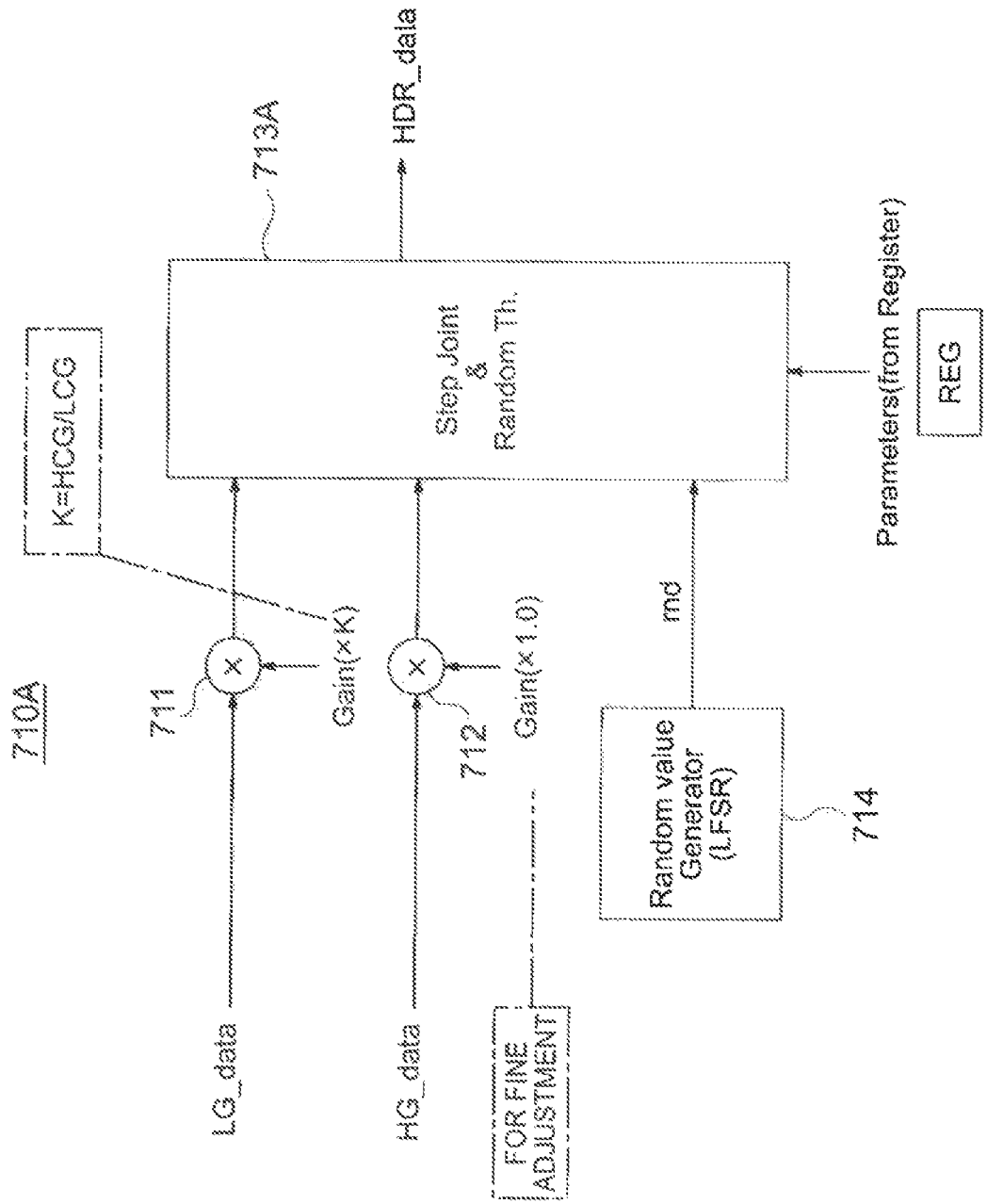
FIG. 7 is a view showing an example of the configuration of a signal processing part according to a second embodiment of the present invention.
Figure 8:
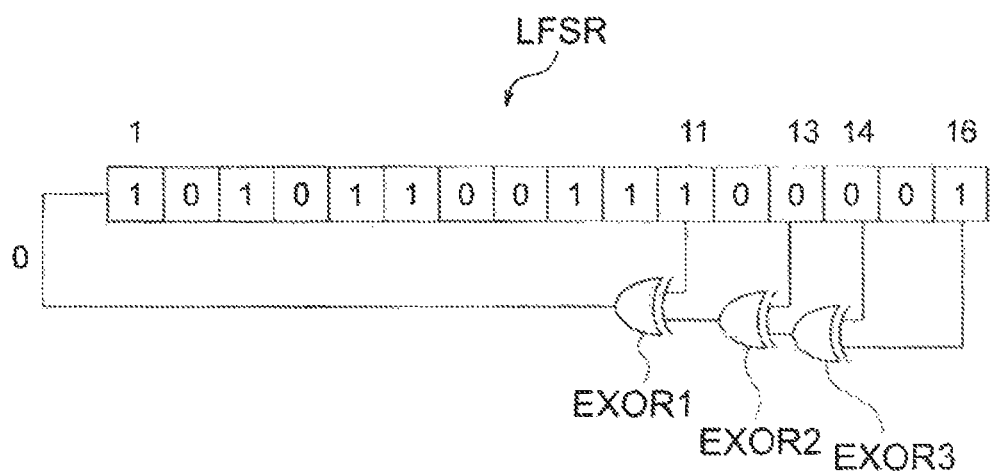
FIG. 8 is a view showing an example of the concrete configuration of a random number generating part in FIG. 7.

FIG. 7 is a view showing an example of a configuration of a signal processing part according to a second embodiment of the present invention. FIG. 8 is a view showing an example of a concrete configuration of a random number generating part in FIG. 7.

A difference of a signal processing part 710A in FIG. 7 according to the second embodiment from the signal processing part 710 in FIG. 3 according to the first embodiment resides in that a random number generating part 714 is provided and the combinational processing part 713A performs addition or subtraction of random numbers rnd(clk) with respect to the threshold value J_Thresh to set the threshold value. Here, clk is the same frequency as the transfer clock of the pixel data, and the random number changes in units of pixels.

The combinational processing part 713A can set for example the mean value of the plurality of threshold values as the center threshold value corresponding to the reference threshold value J_Thresh. As a center threshold value, it makes the value which is newly calculated by adding a random number rnd(clk) generated in the random number generating part 714 to the center threshold value J_Thresh in an initial stage as the second center threshold value (J_Thresh+rnd (clk)) and performs the selection processing of the signal which becomes necessary for the composition based on the second center threshold value (J_Thresh+rnd (clk)).

The random number generating part 714, for example as shown in FIG. 8, is formed by a linear feedback shift register LFSR including exclusive OR gates EXOR1 to EXOR3. FIG. 8 is shown as an example of a case of 16 bits.

In combining two signals corresponding to Equation 3 in the first embodiment in the combinational processing part 713A in the second embodiment, the processing is carried out under the following set conditions:

if (data_$hcg$<($j$_thresh+$rnd$($clk$)−step2))

data_dhdr=−data_$hcg$;

if (data_$hcg$<($j$_thresh+$rnd$($clk$)−step1))

data_dhdr=(data_$hcg$×3+data_$lcg$)/4;

if (data_$hcg$<($j$_thresh+$rnd$($clk$)+step1))

data_dhdr=(data_$hcg$+data_$lcg$)/2;

if (data_$hcg$<($j$_thresh+$rnd$($clk$)+step2))

data_dhdr=(data_$hcg$+data_$lcg$×3)/4;

if (data_$hcg$>($j$_thresh+$rnd$($clk$)+step2))

data_dhdr=data_$lcg$;   (Equation 7)

That is, in this processing, the same processing as the processing in Equation 3 and FIG. 6 described above is carried out except that the value newly calculated by adding the random number rnd (clk) generated in the random number generating part 714 to the center threshold value J_Thresh in the initial stage is applied as the second center threshold value (J_Thresh+rnd(clk)). Accordingly, here, a detailed explanation is omitted.

According to the second embodiment, the same effects as those in the first embodiment explained above can be obtained. That is, according to the second embodiment, even in a case where there is variation in individual units of the solid-state imaging devices or variation among pixels in one unit, smooth switching of the plurality of signals to be assembled together (to be combined) is possible, discontinuous points can be reduced, and consequently noise can be reduced, therefore it becomes possible to generate a high quality and high dynamic image signal with little noise. Further, it becomes possible to absorb individual variations therefore it becomes possible to improve the yield of products.

Application Example

In the embodiments explained above, as an example of the plurality of read-out signals, the case where the two signals of the high conversion gain signal HCG and low conversion gain signal LCG were combined to extend the dynamic range was explained. However, it is also possible to apply the present invention to a case where three or four or more signals having different characteristics are combined while making their inclinations equal.

Figure 9:
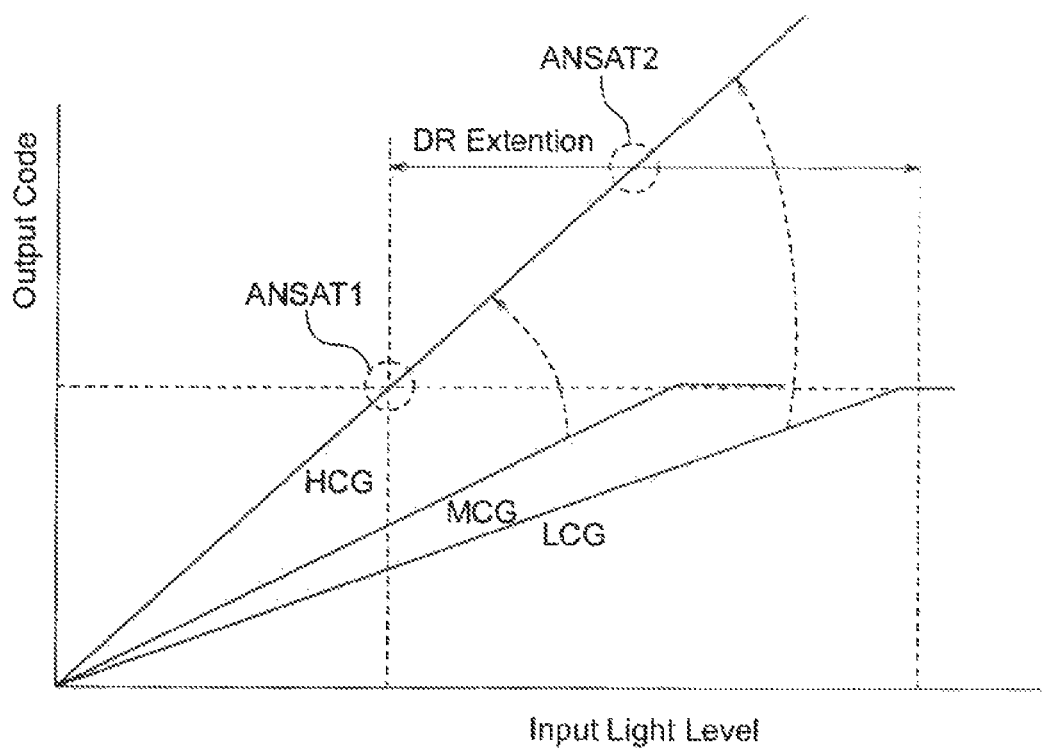
FIG. 9 is a view for explaining processing of combining three signals of a high conversion gain signal, a middle gain signal, and a low conversion gain signal while making their inclinations equal.

FIG. 9 is a diagram for explaining processing for combining three signals of a high conversion gain signal HCG, middle conversion gain signal MCG, and low conversion gain signal LCG while making their inclinations equal.

In the example in FIG. 9, the middle conversion gain signal MCG which is intermediate between the high gain and the low gain is added to the coverage of combination.

In this case, in the non-saturated area ANSAT1 before saturation of the high conversion gain signal HCG and in which linearity is maintained, the middle conversion gain signal MCG and the high conversion gain signal HCG are smoothly combined stepwisely according to the same processing as the combinational processing in the embodiments explained before. The gain ratio for adjusting the inclinations at this time is HCG/MCG. In the combinational processing in the non-saturated area ANSAT1, the middle conversion gain signal MCG is handled as the same signal as the low conversion gain signal in the combinational processing in the embodiments.

In the same way, in a non-saturated area ANSAT2 which is before saturation of the middle conversions gain signal MCG and in which linearity is maintained, according to the same processing as the combinational processing in the embodiments explained before, the middle conversion gain signal MCG and the low conversion gain signal LCG are smoothly combined stepwisely. The gain ratio for adjusting the inclinations at this time is MCG/LCG. In the combinational processing in the non-saturated area ANSAT2, the middle conversion gain signal MCG is handled as the same signal as the high conversion gain signal in the combinational processing in the embodiments.

In this case as well, the same effects as those in the first and second embodiments explained above can be obtained.

Modification

Figure 10:
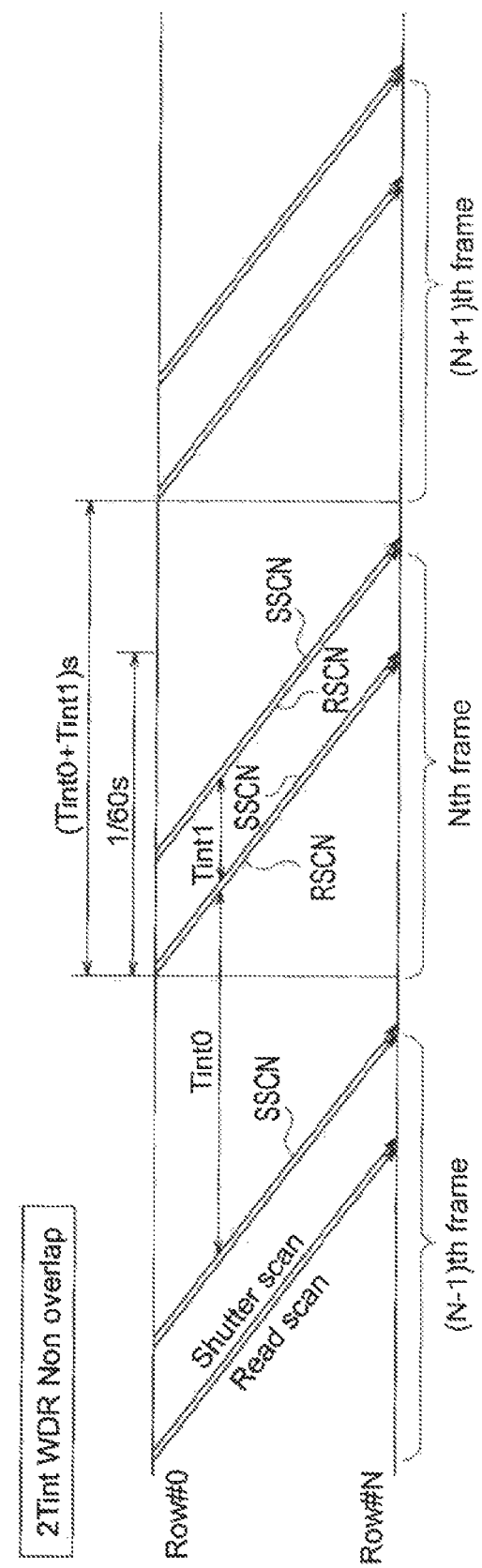
FIG. 10 is a view showing an example of a technique for raising the dynamic range dividing exposure into two or more steps of image capture corresponding to a high luminance side by a short exposure time and image capture corresponding to a low luminance by a long exposure time.

FIG. 10 is a diagram showing an example of a technique for raising the dynamic range by dividing the exposure to two steps or more of image capture corresponding to a high luminance side by a short exposure time and image capture corresponding to a low luminance by a long exposure time.

In the embodiments explained above, the explanation was given by taking as an example the case of a configuration in which two systems of the selection transistors SEL-Tr and source follower transistors SF-Tr were provided in the configuration itself of the pixel PXL so that the plurality of read-out signals of the two signals of the high conversion gain signal HCG and low conversion gain signal LCG were generated, but the present invention is not limited to such a configuration. For example, it is also possible to provide only one system of a selection transistor SEL-Tr and source follower transistor SF-Tr in the configuration itself of the pixel PXL and, as shown in FIG. 10, employ a technique of raising the dynamic range by dividing exposure into two or more steps of image capture corresponding to a high luminance side by a short exposure time and image capture corresponding to a low luminance by a long exposure time.

In the readout operation of the pixels, under the control of the timing controller etc., as shown in FIG. 10, a shutter scan SSCN is carried out, then a read scan RSCN is carried out. However, in the example in FIG. 10, two exposure periods Tint0 and Tint1 from when the shutter scan SSCN is carried out to when the read scan RSCN is then carried out are provided, thereby imparting a time difference.

In this case as well, the same effects as those in the first and second embodiments explained above can be obtained.

Figure 11:
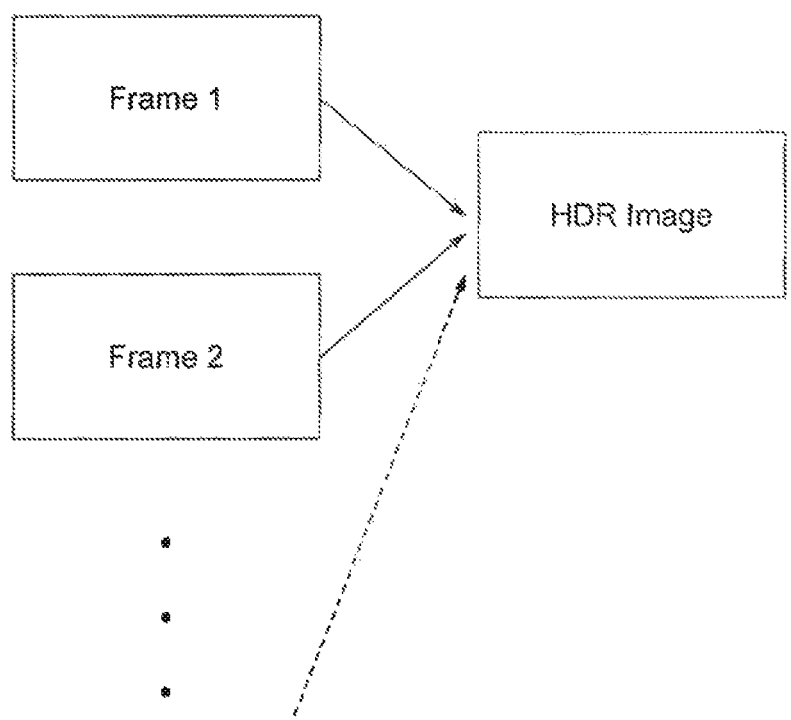
FIG. 11 is a view for explaining an example of raising a dynamic range in units of frames.

FIG. 11 is a diagram for explaining an example of raising the dynamic range in units of frames. Further, in the embodiments explained above, the explanation was given of the example of raising the dynamic range in units of pixels. However, the present invention can also be applied to the case of raising the dynamic range in units of frames as shown in FIG. 11.

In this case as well, the same effects as those by the first and second embodiments explained above can be obtained.

The solid-state imaging device 10 explained above can be applied as an imaging device to a digital camera, video camera, portable terminal, or monitoring camera, camera for a medical endoscope, or other electronic apparatuses.

Figure 12:
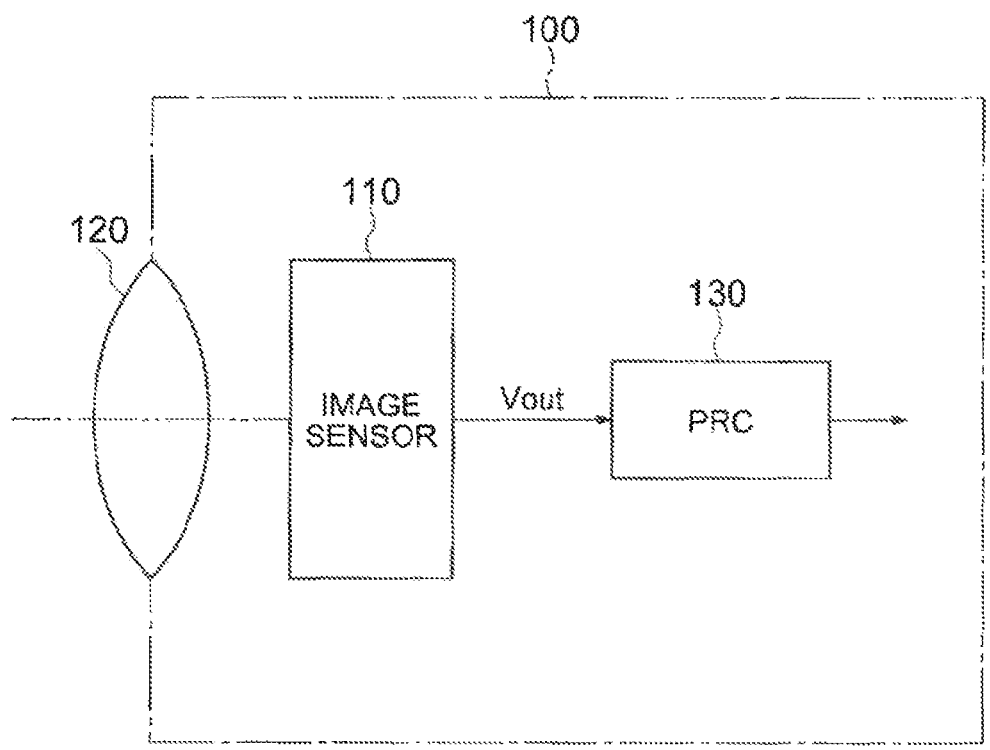
FIG. 12 is a view showing an example of the configuration of an electronic apparatus to which a solid-state imaging device according to an embodiment of the present invention is applied.

FIG. 12 is a view showing an example of the configuration of an electronic apparatus mounting a camera system to which the solid-state imaging device according to an embodiment of the present invention is applied.

The electronic apparatus 100, as shown in FIG. 12, has a CMOS image sensor 110 to which the solid-state imaging device 10 according to an embodiment can be applied. Further, the electronic apparatus 100 has an optical system (lens etc.) 120 which guides incident light (forms a subject image) into a pixel region of this CMOS image sensor 110. The electronic apparatus 100 has a signal processing circuit (PRC) 130 for processing the output signals of the CMOS image sensor 110.

The signal processing circuit 130 applies predetermined signal processing with respect to the output signals of the CMOS image sensor 110. The image signal processed in the signal processing circuit 130 can be projected as a moving image onto a monitor formed by a liquid crystal display or the like or can be output to a printer. Further, it can be directly recorded in a storage medium such as a memory card. Various embodiments are possible.

As explained above, by mounting the solid-state imaging device 10 explained before as the CMOS image sensor 110, it becomes possible to provide a high performance, small-sized, and low cost camera system. Further, it is possible to realize for example a monitoring camera or camera for a medical endoscope or other electronic apparatus which is used for applications where there are restrictions in mounting size, number of connectable cables, cable length, installation height, etc. in requirements for camera installation.

The invention claimed is:

1. A solid-state imaging device capable of extending a dynamic range by combining a plurality of read-out signals, comprising:
   a signal processing part which, when combining a plurality of read-out signals, selects at least one signal which becomes necessary for a combinational operation in accordance with a result of a comparison between at least one read-out signal among the plurality of read-out signals and a threshold value,
   applies the selected signal to the combinational processing and generates a combined signal extended in the dynamic range, wherein
   the signal processing part dynamically changes the threshold value, and
   the signal processing part applies to the combinational processing, as the threshold value,
     a reference threshold value which is set in advance and
     a new threshold value determined by comparison processing of the reference threshold value and a predetermined step value, wherein:
   the plurality of read-out signals include a first signal and a second signal which are saturated by at different quantity of incident light, and wherein
   the signal processing part combines the first signal and the second signal by combination processing in a non-saturated area of the first signal before saturation and maintained the linearity, and in the combination,
   sets the reference threshold value at a position of a center part of the non-saturated area as a center threshold value,
   sets a step value corresponding to the set a join position to be joined, in which the step value gradually increases from the center position where the center threshold is toward at least one of the first signal endmost part and the second signal endmost part,
   sets a new threshold value for the corresponding combined position by comparison processing of the center threshold value as the reference threshold and the set step value, and
   applies the new threshold value, and performs the combinational processing in accordance with a result of a comparison between the threshold value at the join position and the first signal or the second signal.

2. The solid-state imaging device according to claim 1, wherein:
   the signal processing part
   includes a weighting processing part for weighting the plurality of read-out signals and
   has a new threshold value for weighting, and
   the weighting processing part, at the signal level of the area sandwiched by the threshold values, calculates an average weighting value according to the weighting value assigned to this area and outputs the average weighting value as the combined signal of the area.

3. The solid-state imaging device according to claim 2, wherein:
   provision is made of a plurality of threshold values,
   the weighting processing part includes an averaging processing function of averaging the plurality of read-out signals, and
   the averaging processing function uses the averaged value of the signals at the signal level of the area sandwiched by the threshold values as one output.

4. The solid-state imaging device according to claim 1, wherein:
   the signal processing part
   includes a random number generating part,
   sets a mean value of the plurality of threshold values as a center threshold value corresponding to the reference threshold value,
   as the center threshold value, determines a value which is newly calculated by adding a random number generated in the random number generating part to the center threshold value in an initial stage as the second center threshold value, and
   performs selection processing of a signal which becomes necessary for the combinational processing based on the second center threshold value.

5. The solid-state imaging device according to claim 1, wherein:
   the device includes a memory part capable of rewriting, and
   the reference threshold value is written in the memory part.

6. The solid-state imaging device according to claim 1, having a plurality of signal processing parts.

7. The solid-state imaging device according to claim 1, wherein:
   the plurality of read-out signals read out from the pixels each including a photoelectric conversion element includes at least one set of
   a low conversion gain signal and
   a high conversion gain signal which is saturated by a smaller quantity of incident light in comparison with the low conversion gain signal, and
   the signal processing part makes inclinations of the low conversion gain signal and the high conversion gain signal equal and combines the low conversion gain signal and the high conversion gain signal by the combinational processing in a non-saturated area of the high conversion gain signal before saturation and maintains the linearity.

8. The solid-state imaging device according to claim 7, wherein the signal processing part performs the combinational processing using at least one of the low conversion gain signal and the high conversion gain signal as a reference.

9. The solid-state imaging device according to claim 7, wherein:
the signal processing part
performs the combinational processing using the high conversion gain signal as a reference,
applies to the combinational processing as the threshold value
a reference threshold value which is set in advance and
at least one new threshold value which is determined by comparison processing of the reference threshold value and a predetermined step value,
sets the reference threshold value at a position of a center part of the non-saturated area as a center threshold value,
sets at least two high gain side join positions including a high gain signal endmost part side join position between the set position of the center threshold value and the high gain signal endmost part side join position at which the combined signal should be joined with the high conversion gain signal and sets a high gain side step value corresponding to the set high gain side join position which gradually becomes larger from the position of the center part toward the high gain signal endmost part, and
subtracts the set high gain side step value from the center threshold value, sets the result as the new threshold value of the corresponding high gain side join position, applies the new threshold value, and performs the combinational processing in accordance with a result of a comparison between the threshold value at the high gain side join position and the high conversion gain signal.

10. The solid-state imaging device according to claim 7, wherein:
the signal processing part
performs the combinational processing using the high conversion gain signal as a reference,
applies to the combinational processing as the threshold value
a reference threshold value which is set in advance and
at least one new threshold value which is determined by comparison processing of the reference threshold value and a predetermined step value,
sets the reference threshold value at the position of the center part of the non-saturated area as a center threshold value,
sets at least two low gain side join positions including a low gain signal endmost part side join position between the set position of the center threshold value and the low gain signal endmost part side join position at which the combined signal should be joined with the low conversion gain signal and sets a low gain side step value corresponding to the set low gain side join position which gradually becomes larger from the position of the center part toward the low gain signal endmost part, and
adds the set low gain side step value to the center threshold value, sets the result as the new threshold value of the corresponding low gain side join position, applies the new threshold value, and performs the combinational processing in accordance with the result of comparison between the threshold value at the low gain side join position and the high conversion gain signal.

11. The solid-state imaging device according to claim 7, wherein:
the signal processing part
performs the combinational processing using the high conversion gain signal as a reference,
applies to the combinational processing as the threshold value
a reference threshold value which is set in advance and
at least one new threshold value which is determined by comparison processing of the reference threshold value and a predetermined step value,
sets the reference threshold value at a position of a center part of the non-saturated area as a center threshold value,
sets at least two high gain side join positions including a high gain signal endmost part side join position between the set position of the center threshold value and the high gain signal endmost part side join position at which the combined signal should be joined with the high conversion gain signal and sets a high gain side step value corresponding to the set high gain side join position which gradually becomes larger from the position of the center part toward the high gain signal endmost part,
sets at least two low gain side join positions including a low gain signal endmost part side join position between the set position of the center threshold value and the low gain signal endmost part side join position at which the combined signal should be joined with the low conversion gain signal and sets a low gain side step value corresponding to the set low gain side join position which gradually becomes larger from the position of the center part toward the low gain signal endmost part,
subtracts the set high gain side step value from the center threshold value, sets the result as the new threshold value of the corresponding high gain side join position, applies the new threshold value, and performs the combinational processing in accordance with a result of a comparison between the threshold value at the high gain side join position and the high conversion gain signal, and
adds the set low gain side step value to the center threshold value, sets the result as the new threshold value of the corresponding low gain side join position, applies the new threshold value, and performs the combinational processing in accordance with the result of comparison between the threshold value at the low gain side join position and the high conversion gain signal.

12. The solid-state imaging device according to claim 11, wherein, at the signal level of the area sandwiched between the threshold value of the high gain side join position or low gain side join position and the threshold value selected by comparison with the high conversion gain signal, the signal processing part calculates the average weighting value according to the weighting value assigned to the area and outputs the average weighting value as the combined signal of the area.

13. The solid-state imaging device according to claim 11, wherein:
when the result of comparison between the threshold value of the high gain signal endmost part side join position and the high conversion gain signal is that the threshold value is larger, the signal processing part applies the high conversion gain signal as the combined signal and, when the result of comparison between the threshold value of the low gain signal endmost part side join position and the high conversion gain signal is that the threshold value is smaller, the signal processing part applies the low conversion gain signal as the combined signal.

14. A method for driving a solid-state imaging device capable of extending a dynamic range by combining a plurality of read-out signals, comprising:

a comparison process of, when combining the plurality of read-out signals, comparing at least one read-out signal among the plurality of read-out signals and a threshold value, a selection process of selecting at least one signal which becomes necessary for a combinational operation in accordance with the result of comparison, and a generation process of applying the selected signal to combinational processing and generating a combined signal extended in dynamic range, wherein the processing in the comparison process, the selection process, and the generation process is performed by dynamically changing the threshold value, and as the threshold value,
a reference threshold value which is set in advance and
a new threshold value determined by comparison process of the reference threshold value and a predetermined step value, wherein:

the plurality of read-out signals include a first signal and a second signal which are saturated by at different quantity of incident light, and wherein in the comparison process, the selection process, and the generation process, combines the first signal and the second signal by combination processing in a non-saturated area of the first signal before saturation and maintained the linearity, and in the combination, sets the reference threshold value at a position of a center part of the non-saturated area as a center threshold value, sets a step value corresponding to the set a join position to be joined, in which the step value gradually increases from the center position where the center threshold is toward at least one of the first signal endmost part and the second signal endmost part, sets a new threshold value for the corresponding combined position by comparison processing of the center threshold value as the reference threshold and the set step value, and applies the new threshold value, and performs the combinational processing in accordance with a result of a comparison between the threshold value at the join position and the first signal or the second signal.

15. An electronic apparatus, comprising:

a solid-state imaging device capable of extending a dynamic range by combining a plurality of read-out signals and an optical system for forming a subject image in the solid-state imaging device, wherein the solid-state imaging device includes a signal processing part which, when combining the plurality of read-out signals, selects at least one signal which becomes necessary for the combinational operation in accordance with a result of a comparison between at least one read-out signal among the plurality of read-out signals and a threshold value, applies the selected signal to the combinational processing, and generates a combined signal extended in dynamic range, the signal processing part dynamically changes the threshold value, and the signal processing part applies to the combinational processing, as the threshold value,
a reference threshold value which is set in advance and
a new threshold value determined by comparison processing of the reference threshold value and a predetermined step value, wherein the plurality of read-out signals include a first signal and a second signal which are saturated by at different quantity of incident light, and wherein the signal processing part combines the first signal and the second signal by combination processing in a non-saturated area of the first signal before saturation and maintained the linearity, and in the combination, sets the reference threshold value at a position of a center part of the non-saturated area as a center threshold value, sets a step value corresponding to the set a join position to be joined, in which the step value gradually increases from the center position where the center threshold is toward at least one of the first signal endmost part and the second signal endmost part, sets a new threshold value for the corresponding combined position by comparison processing of the center threshold value as the reference threshold and the set step value, and applies the new threshold value, and performs the combinational processing in accordance with a result of a comparison between the threshold value at the join position and the first signal or the second signal.

* * * * *